Jan. 31, 1939.　　　G. FOX　　　2,145,649
TUYÈRE
Filed Aug. 22, 1934　　　9 Sheets-Sheet 1
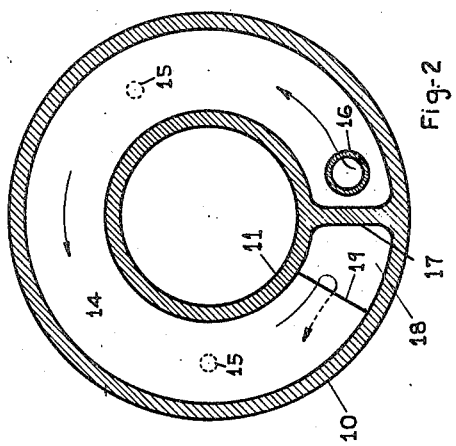
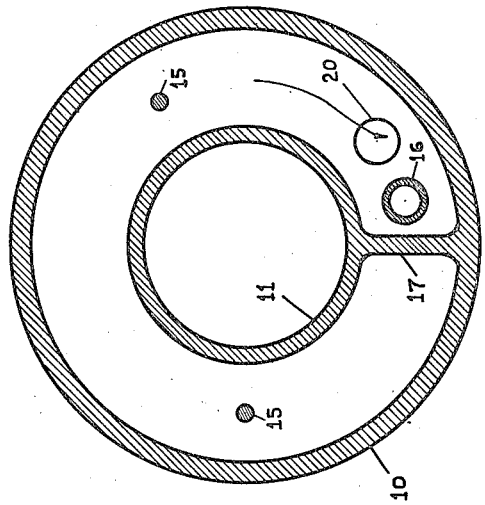
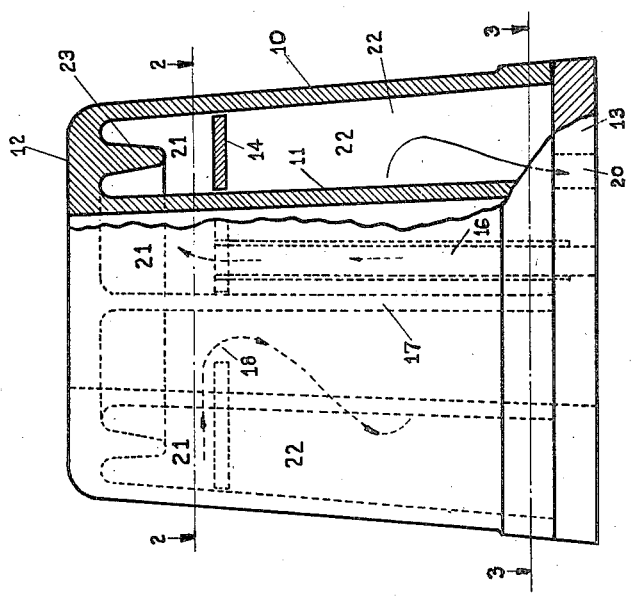
Inventor
Gordon Fox.
By Wilkinson Huxley Byron & Knight
Attys.

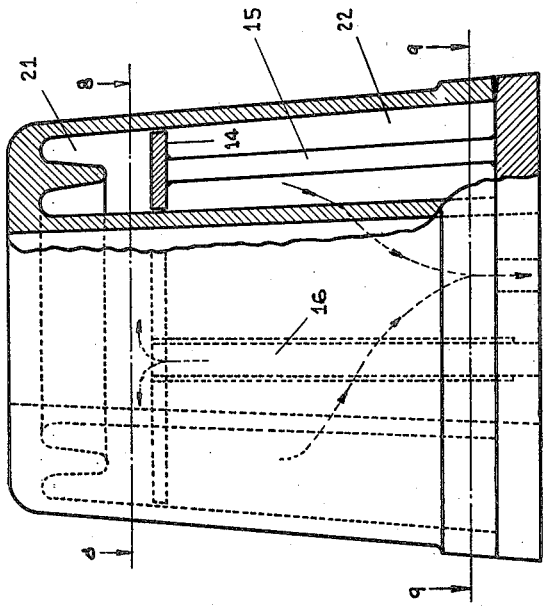
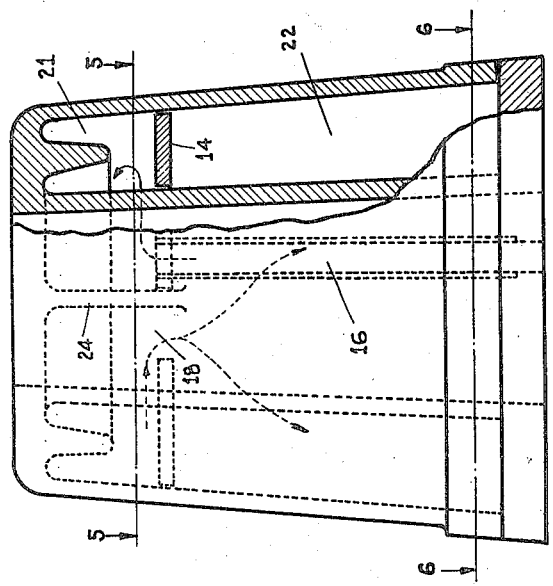

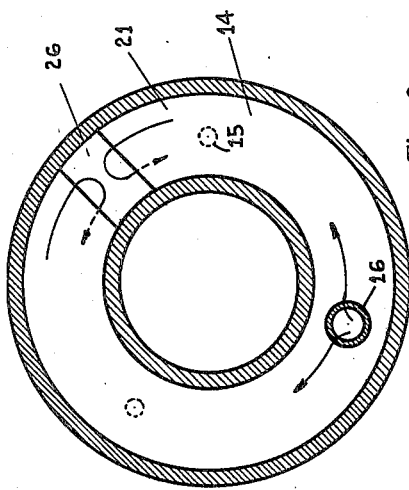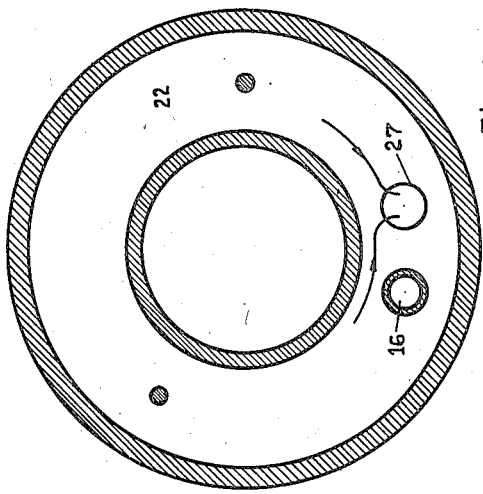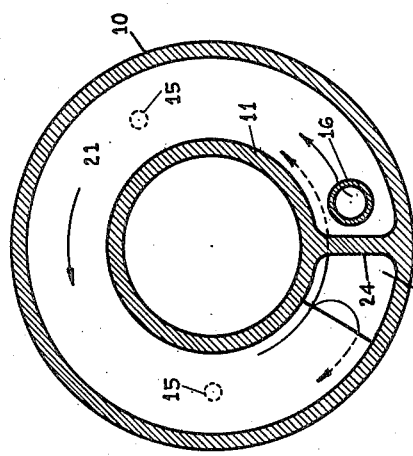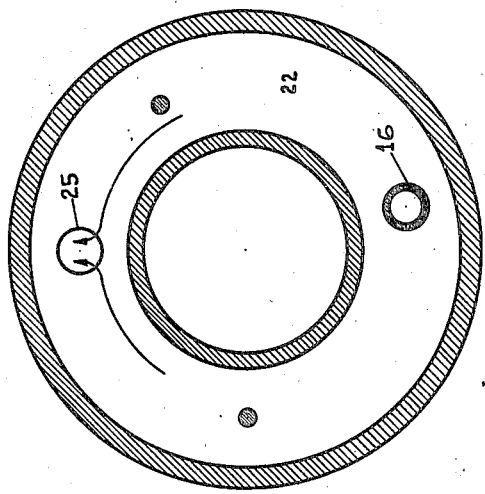

Jan. 31, 1939.   G. FOX   2,145,649
TUYÈRE
Filed Aug. 22, 1934   9 Sheets-Sheet 4
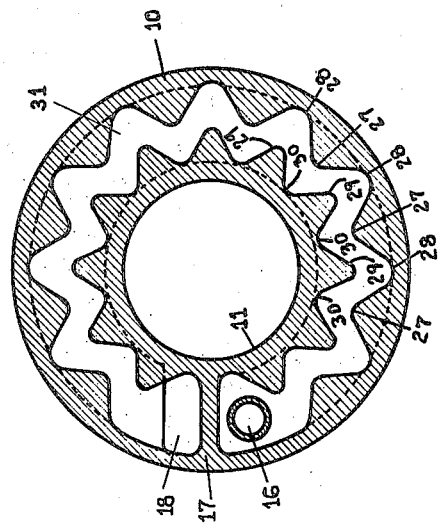
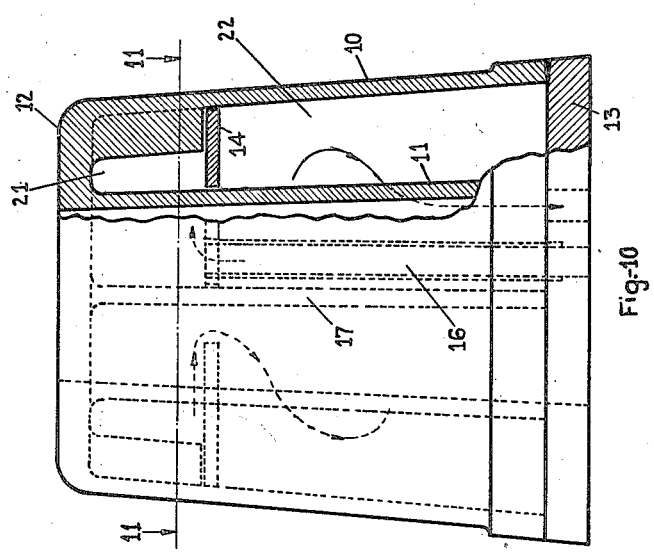
Inventor
Gordon Fox
BY Wilkinson, Huxley, Byron & Knight
Attys.

Jan. 31, 1939.  G. FOX  2,145,649
TUYÈRE
Filed Aug. 22, 1934    9 Sheets-Sheet 5

Inventor
Gordon Fox.
By Wilkinson Huxley Byron & Knight
Attys.

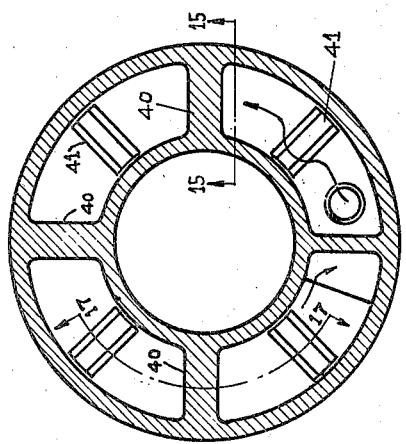
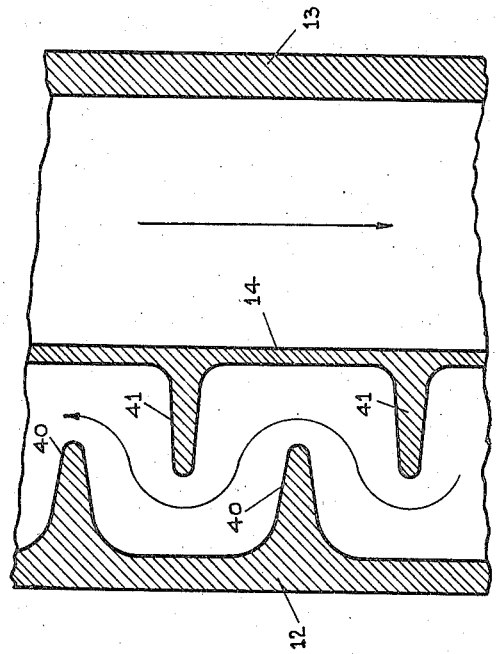
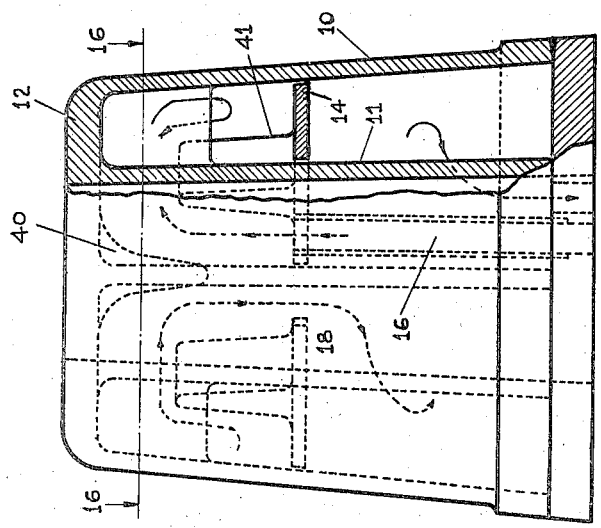

Jan. 31, 1939.  G. FOX  2,145,649
TUYÈRE
Filed Aug. 22, 1934  9 Sheets-Sheet 7
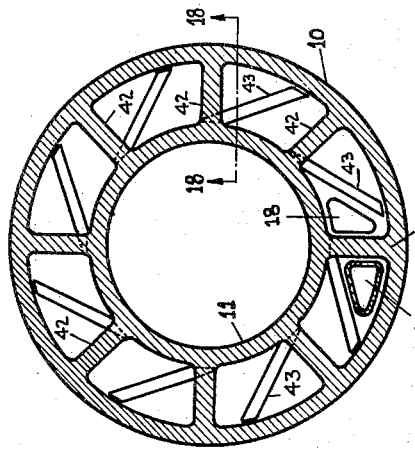
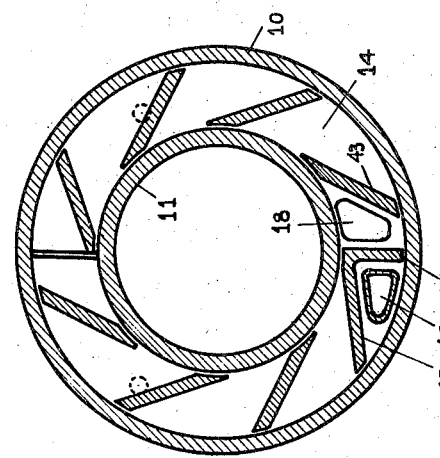
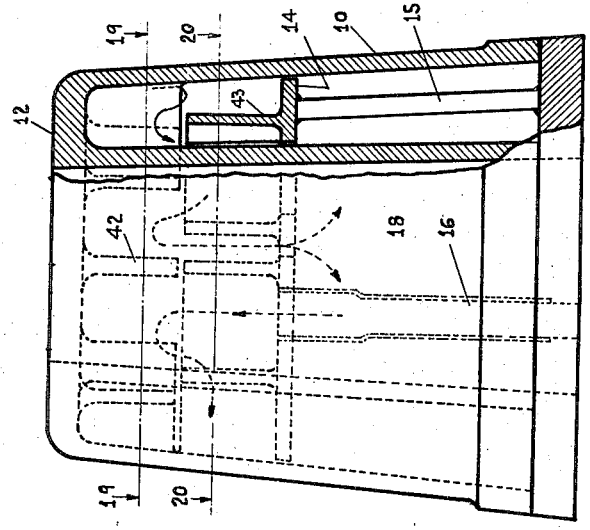
Inventor
Gordon Fox.

Jan. 31, 1939.   G. FOX   2,145,649
TUYÈRE
Filed Aug. 22, 1934   9 Sheets-Sheet 8
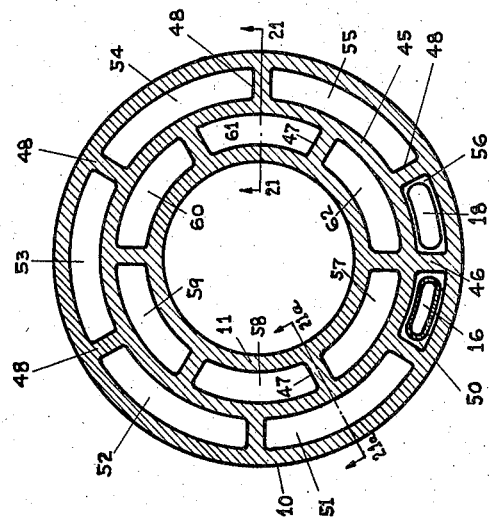
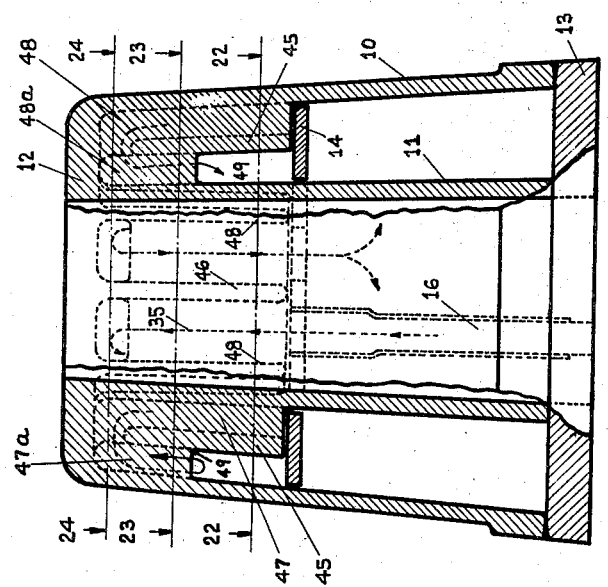
Inventor
Gordon Fox.
By Wilkinson Huxley, Byron & Knight
Attys.

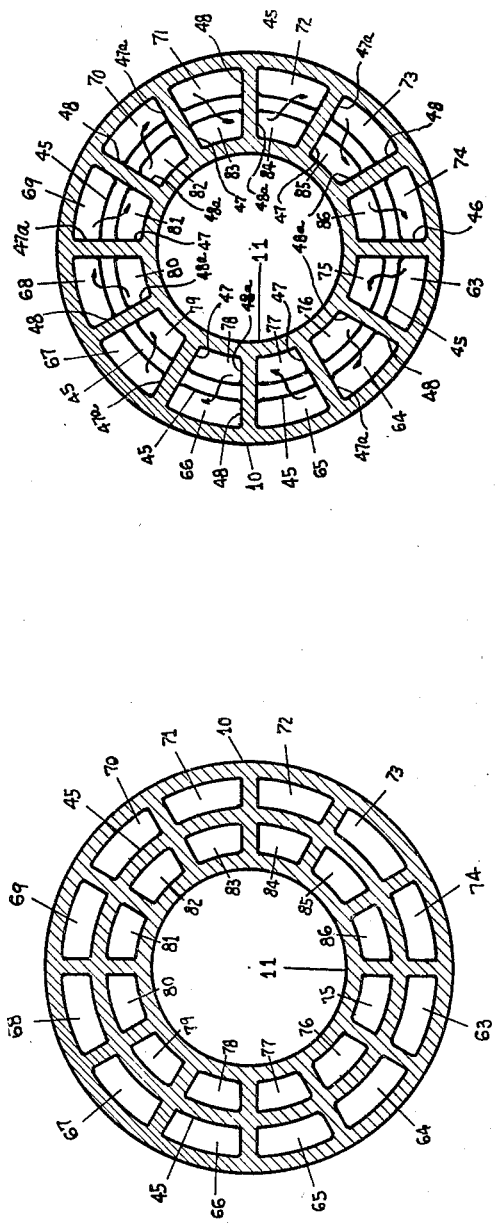
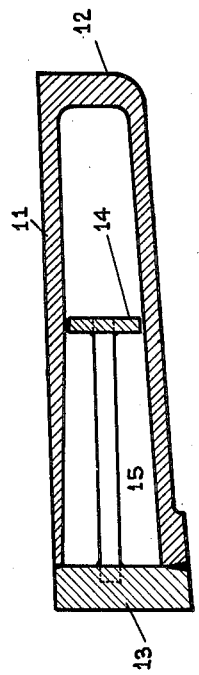

Patented Jan. 31, 1939

2,145,649

UNITED STATES PATENT OFFICE 2,145,649

TUYÈRE

Gordon Fox, Chicago, Ill., assignor to Freyn Engineering Company, Chicago, Ill., a corporation of Maine Application August 22, 1934, Serial No. 740,930

42 Claims. (Cl. 122—6.6)

The present invention relates to improvements in tuyères.

More particularly the present invention relates to tuyères such as are used in blast furnaces. Such tuyères are subjected to the temperature of the hot blast delivered therethrough into the blast furnace and also are subjected to the temperatures developed within the blast furnace as well as to the punishment due to contact with molten metal.

The nose portion of the tuyère is subjected to the most damaging effects and is the portion which is most liable to give way in service. It has been common practice to cool tuyères by means of flowing water but up until recently the distribution of the flowing water within the nose and the velocity of flow of water in the nose has not been sufficient to carry away the heat from the nose of the tuyère at a sufficiently high rate to avoid relatively speedy destruction of the tuyère.

An object of the present invention is to provide an improved tuyère which may be made at relatively low cost and in which the cooling water is directed to the nose portion of the tuyère and circulated therethrough at a relatively high velocity.

A further object is to provide a water cooled tuyère having improved efficiency in the cooling of the nose portion thereof.

A further object is to provide an improved tuyère which is relatively simple to manufacture but is sturdy in service.

A further object is to provide an improved tuyère which is well adapted to meet the needs of commercial service.

Further objects will appear as the description proceeds.

Referring to the drawings—

Figure 1 is a view in elevation, parts being broken away, illustrating one embodiment of the present invention;

Figure 2 is a transverse cross sectional view taken along the plane indicated by the arrows 2—2 of Figure 1;

Figure 3 is a transverse sectional view taken along the plane indicated by the arrows 3—3 of Figure 1;

Figure 4 is a view in elevation, parts being broken away, showing a modified embodiment of the present invention;

Figure 5 is a transverse sectional view taken along the plane indicated by the arrows 5—5 of Figure 4;

Figure 6 is a transverse sectional view taken along the plane indicated by the arrows 6—6 of Figure 4;

Figure 7 is a view in elevation of another embodiment of the present invention;

Figure 8 is a transverse sectional view taken along the plane indicated by the arrows 8—8 of Figure 7;

Figure 9 is a transverse sectional view taken along the plane indicated by the arrows 9—9 of Figure 7;

Figure 10 is a view in elevation of another embodiment of the present invention;

Figure 11 is a transverse sectional view taken along the plane indicated by the arrows 11—11 of Figure 10;

Figure 15 is a view in elevation, a part being broken away, of a still further embodiment of the present invention, the broken away part illustrating a section taken along the plane indicated by the arrows 15—15 of Figure 16;

Figure 16 is a transverse sectional view taken along the plane indicated by the arrows 16—16 of Figure 15;

Figure 17 is a developed view illustrating the course of cooling water through the nose of the tuyère, said developed view being taken along the curved surface indicated by the arrows 17—17 in Figure 16, said curved surface being developed into a plane;

Figure 18 is a view in elevation of a still further embodiment of the present invention, parts being broken away, the broken away parts being along the plane indicated by the arrows 18—18 of Figure 19;

Figure 19 is a transverse sectional view taken along the plane indicated by the arrows 19—19 of Figure 18;

Figure 20 is a transverse sectional view taken along the plane indicated by the arrows 20—20 of Figure 18;

Figure 21 is a view in elevation, parts being broken away, illustrating still another embodiment of the present invention, the broken away parts being along the plane indicated by the arrows 21—21 and along the plane indicated by the arrows 21a—21a of Figure 22;

Figure 22 is a transverse sectional view taken along the plane indicated by the arrows 22—22 of Figure 21;

Figure 23 is a transverse sectional view taken along the plane indicated by the arrows 23—23 of Figure 21;

Figure 24 is a transverse sectional view taken along the plane indicated by the arrows 24—24 of Figure 21; and Figure 25 is a view in elevation showing a portion of a tuyère jacket applicable to the modifications illustrated in the preceding figures.

Figure 13:
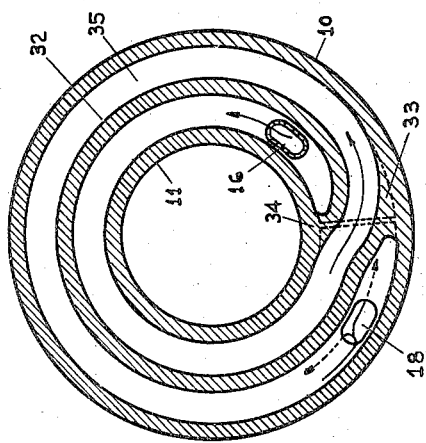
Figure 13 is a transverse sectional view taken along the plane indicated by the arrows 13—13 of Figure 12.

Referring first to the embodiment of the present invention disclosed in Figures 1, 2 and 3, the numeral 10 indicates the outer cone wall, the numeral 11 indicates the inner cone wall, the numeral 12 indicates the nose wall, and the numeral 13 indicates the base wall of the tuyère. For convenience in manufacture, the two cone walls 10 and 11 and the nose wall 12 may be cast as an integral structure, and the base wall 13 may be brazed or otherwise secured to the rear extremities of the outer cone wall 10 and the inner cone wall 11. Located adjacent to but spaced from the nose wall 12 is the partition wall 14 disposed in substantially parallel relationship with the nose wall 12. Said partition wall 14 is in the form of an annulus located between the outer cone wall 10 and the inner cone wall 11 and need fit only loosely between said cone walls. Said partition wall 14 may be supported by means of a pair of struts 15—15, which struts have their outer extremities secured to the base wall 13 and their inner extremities secured to said partition wall 14. Said partition wall 14 is also supported by a tube 16, which tube extends through a corresponding opening in the base wall 13 and is brazed or otherwise secured to said base wall 13. The inner extremity of the tube 16 extends through the partition wall 14 and is brazed or otherwise secured to said partition wall 14. Though a tube is illustrated, it will be clear that other forms of conduit or passageway may be used for conducting cooling medium between the exterior of the tuyère and the nose portion thereof.

In the form of the invention disclosed in Figures 1, 2 and 3, a radial partition wall 17 is provided extending from the nose wall 12 to the base wall 13. The partition wall 14 is split to provide space for the radial wall 17. The partition wall 14 is also provided with an aperture 18, which aperture is defined by the edge portion 19 of the partition wall 14, the inner portion of the radial partition wall 17 and adjacent portions of the outer cone wall 10 and the inner cone wall 11. Located in the base wall 13 adjacent to the tube 16 is the outlet opening 20. The inlet tube 16 will be connected to a source of water supply outside of the tuyère, said tube 16 communicating with the space, indicated by the numeral 21, defined by the partition wall 14, the nose wall 12 and the adjacent portions of the outer cone wall 10 and the inner cone wall 11. The space 21 communicates through the aperture 18 with the annular space, indicated by the numeral 22, defined by the partition wall 14, the base wall 13 and the adjacent portions of the outer cone wall 10 and the inner cone wall 11.

Extending inwardly from the nose wall 12 is the annular partition wall 23 which extends into the annular space 21. This wall 23 may be continuous or non-continuous, as preferred. Said annular partition wall 23 should preferably taper from the nose wall 12 toward the partition wall 14, whereby to effectively transmit heat from the nose wall 12 down to the cooling water in the annular space 21. Said annular partition wall 23 merges with the radial wall 17 whereby to provide a reinforcement for mechanically strengthening the nose of the tuyère.

In operation, water will be admitted through the tube 16 and will flow directly to the space 21 in the nose portion of the tuyère. Said tube 16 communicates with the space 21 at a point adjacent to the radial wall 17. Water entering the space 21 will be caused to circulate circumferentially through the space 21 through the aperture 18, which is located on the opposite side of the radial wall 17. The cooling water from the pipe 16 will, therefore, be delivered first to the nose portion of the tuyère where it is needed most. However, if preferred, the direction of flow may be reversed, the cooling water entering the aperture 20, traversing the base portion of the tuyère, entering the nose portion through the aperture 18, and discharging through the tube 16. This reversal of flow may be had in any of the modifications illustrated. The circumferentially extending wall 23 will have the function of increasing the heat dissipating surface contacted by the cooling water and will aid in reducing the cross sectional area of the water space 21, whereby the flow of water through said space 21 will be relatively high in velocity. The water, after flowing through the nose portion of the tuyère, will be discharged through the aperture 18 into the annular space 22 in the base portion of the tuyère. As will be clear from an inspection of Figures 2 and 3, the aperture 18 and the outlet 20 are adjacent to but on opposite sides of the radial wall 17 so that water entering the base portion of the tuyère through the aperture 18 will be caused to circulate through almost a complete circle around the base portion of the tuyère before being delivered to the outlet aperture 20.

The structure shown in Figures 4, 5 and 6 is similar in many respects to the structure above described. In the structure shown in Figures 4, 5 and 6, the radial wall 24 extends only from the nose wall 12 to the partition wall 14. In the construction of Figures 4, 5 and 6 the cooling water, after flowing through the space 21 in the nose portion of the tuyère and emerging from the aperture 18 in the partition wall 14, may take two parallel paths to the outlet opening 25, which is located at a region approximately diametrically opposite to the inlet tube 16. Inasmuch as the base portion of the tuyère is not subjected to the terrific heat effects to which the nose portion is subjected, the structure disclosed in Figures 4, 5 and 6 may be preferred by some of those skilled in the art, inasmuch as the resistance to the discharge of water through the passage 22 in the base portion of the tuyère is reduced, thereby promoting a higher velocity of flow through the space 21 of the nose portion of the tuyère.

In each of the two embodiments above described only one radial wall is illustrated between the inlet tube 16 and the aperture 18. It will be understood, of course, that the number of inlet tubes and corresponding outlets and radial walls may be multiplied if preferred.

The structure shown in Figures 7, 8 and 9 omits the radial wall 17 of Figures 1, 2 and 3 and the radial wall 24 of Figures 5, 6 and 7. In the structure shown in Figures 7, 8 and 9, cooling water entering the annular space 21 from the inlet tube 16 may take parallel paths, discharging through an aperture 26 in the partition wall 14, which aperture 26 is located in a region spaced from the tube 16. The water discharging through the aperture 26 in the partition wall 14 may again divide into two parallel paths, flowing through the space 22 in the base portion of the tuyère to the outlet opening 27 located adjacent to the tube 16. The structure shown in Figures 7, 8 and 9 is relatively inexpensive to manufacture but lacks the advantage of the high velocity of the cooling water through the nose portion of the tuyère and also lacks the advantage that all cooling medium traverses the entire nose region of the tuyère, and that in the event that steam bubbles should tend to form, the full force of the flowing water will be available to scour off said steam bubbles and carry them away.

Referring now to Figures 10 and 11, a construction is illustrated therein having a modified formation of the nose portion of the tuyère. The nose construction illustrated in Figures 10 and 11 is applicable to any of the three embodiments of the invention heretofore described.

By reference to Figure 11 it will be noted that the outer cone wall 10 at the nose portion thereof is provided with an undulating surface of symmetrical design comprising a plurality of equally spaced crests 27—27 providing the intermediate troughs 28—28. The inner cone wall 11 at the nose portion thereof is provided with an undulating surface of symmetrical design providing the crests 29—29 and the intermediate troughs 30—30. Each crest 27 is symmetrically disposed within a corresponding trough 30 to provide an undulating passageway 31 disposed circumferentially of the nose portion of the tuyère. By reason of the undulating contour of the passageway 31, the superficial area of the water passage in the nose portion of the tuyère is increased. Inasmuch as the cross sectional area of the passageway is considerably reduced, the velocity of water flow through the nose portion is relatively high. The further advantage is had that relatively large cross sections of metal are available to carry the heat units from the exterior surfaces in the nose region of the tuyère to the extended water-contacting surfaces in this region.

Figure 12:
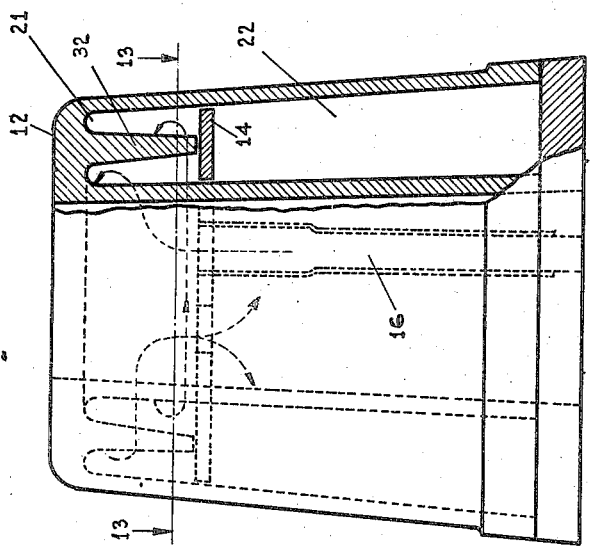
Figure 12 is a view in elevation of still another embodiment of the present invention, parts being broken away.

Referring to Figures 12 and 13, a further modified construction is illustrated therein, which modified construction relates to the nose portion of the tuyère, whereby to increase the heat transfer surface thereof and the velocity of flow of cooling water therethrough. The nose construction illustrated in Figures 12 and 13 is applicable to any of the three embodiments of the invention illustrated in Figures 1 to 9 inclusive.

According to the construction illustrated in Figures 12 and 13, the cooling water is caused to take approximately a double turn around the nose portion of the tuyère. In order to cause this double turn of the cooling water, a partition wall 32 is provided extending inwardly from the nose wall 12 of the tuyère, which partition wall 32 joins with the outer cone wall 10 at the region indicated by the numeral 33 adjacent to the aperture 18. Said partition wall 32 extends circumferentially of the tuyère but has its other extremity joined to the inner cone wall 11 at the region indicated by the numeral 34. Said regions 33 and 34 are located in substantially the same radial plane of the tuyère. By reason of the construction illustrated in Figures 12 and 13, a passageway 35 is provided which provides approximately a double turn of the cooling water around the tuyère. The cooling water enters the nose portion of the tuyère through the tube 16 and takes a counter-clockwise direction as the parts are viewed in Figure 13, and, after making a double turn, passes out through the aperture 18 into the base portion of the tuyère. Although in the construction illustrated the cooling water from the inlet tube 16 passes circumferentially first in contact with the inner cone wall 11, then, on its second turn, in contact with the outer cone wall 10, it will be understood that the construction may be modified by anyone skilled in the art to provide any desired sequence of contact of the cooling water with the inner and outer cone walls.

Figure 14:
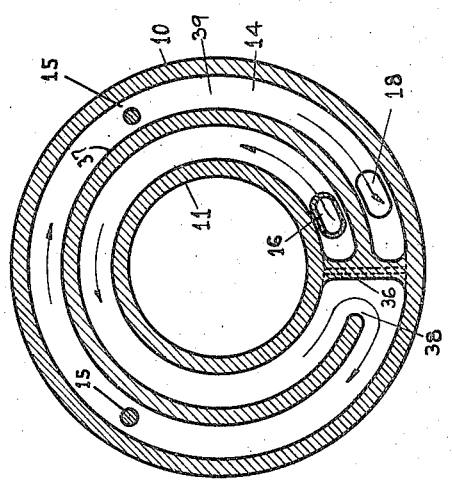
Figure 14 is a transverse sectional view similar to Figure 13 but showing a modification of the structure illustrated in Figure 13.

The construction illustrated in Figure 14 embodies many of the features of the construction shown in Figures 12 and 13. In the construction of Figure 14 the inner cone wall 11 and the outer cone wall 10 are connected together by means of the radial partition wall 36, which extends from the nose wall 12 to the partition wall 14. In the nose portion of the tuyère, between the partition wall 14 and the nose wall 12, is the circumferential partition wall 37, which extends almost but not quite through the circumference of a circle, one end of said circumferential partition wall 37 being united to the radial partition wall 36, the other end of said circumferential partition wall 37 stopping short of said radial partition wall 36 whereby to provide the passageway 38. Said radial partition wall 36, the nose wall 12, the partition wall 14 and the adjacent portions of the inner cone wall 11 and the outer cone wall 10 provide a passageway 39, which makes approximately a double turn around the nose portion of the tuyère. The inlet tube 16 communicates with one end of said double-turn passageway 39. The aperture 18 in the partition wall 14 is located at the other end of said double-turn passageway 39. In other words, the tube 16 and the aperture 18 communicate with the nose portion of the tuyère on opposite sides of the circumferential partition wall 37 but on the same side of the radial partition wall 36. Though Figure 14 shows the cooling water entering the nose portion of the tuyère adjacent to the inner cone wall 11 and leaving said nose portion adjacent to the outer cone wall 10, it will be understood, of course, that the construction may be readily modified to accomplish the reverse sequence of contact of the cooling water with the inner cone wall 11 and the outer cone wall 10.

Referring now to the construction illustrated in Figures 15, 16 and 17, a construction is provided in which the cooling water is led directly to the nose portion of the tuyère and is caused to take a circuitous path in said nose portion, flowing back and forth longitudinally over a plurality of barriers or partitions while traveling circumferentially of the nose portion of the tuyère. According to the construction illustrated in these figures, the nose wall 12 of the tuyère has a plurality of radially disposed barriers or partition walls 40 extending therefrom into the cooling jacket toward the partition wall 14. Said barriers or partition walls are preferably symmetrically disposed relative to one another and stop short of said partition wall 14. Said barriers or partition walls 40 extend between the inner cone wall 11 and the outer cone wall 10. The partition wall 14 is provided on one side thereof with the barriers or partition walls 41, which extend toward the nose wall 12 but stop short thereof. Said barriers or partition walls 41—41 are preferably equi-spaced with reference to one another and are symmetrically disposed midway between the barriers or partition walls 40—40. The barriers or partition walls 41—41 extend to the region of the rearmost extremities of the cooperating barriers or partition walls 40—40. Preferably there is an overlapping relationship between the barriers or partition walls 41—41 and the barriers or partition walls 40—40. In any case, the construction should be such that the cooling water must undulate longitudinally of the tuyère while traversing the nose portion thereof. The spacing between the barriers or partition walls 41—41 and their cooperating barriers or partition walls 40—40 is preferably approximately equal to the spacing of each barrier or partition wall 41 from the adjacent surface of the nose wall 12 and the spacing between the barriers or partition walls 40—40 and the adjacent surface of the partition wall 14, whereby to provide a passageway for the cooling water in the nose portion of the tuyère having a substantially constant cross sectional area between neighboring barriers 40 and 41 and around the extremities of said barriers.

According to the structure disclosed in Figures 18, 19 and 20, cooling water is delivered directly to the nose portion of the tuyère and is caused to take a circuitous course, which may be termed a "helical" course, circumferentially of the nose portion of the tuyère. According to the construction illustrated in these figures, the nose portion of the tuyère is provided with a plurality of radial partition walls 42—42 extending from the nose wall toward the partition wall 14 but stopping short thereof. Said partition wall 14 has a plurality of barriers or partition walls 43—43 projecting from one side thereof and extending toward the nose wall 12 but stopping short thereof. Each of said barriers or partition walls 43 is arranged in angular relationship with a radial plane extending through a longitudinal edge of said barrier or partition wall 43. In other words, the barriers or partition walls are disposed in a position midway between a plane disposed radially of the tuyère and a plane disposed tangentially to the outer cone wall 10 of the tuyère. Expressed in still other language, the barriers or partition walls 43—43 lie in planes bisecting diagonally the pockets formed by the inner cone wall 11, the outer cone wall 10, and the radial barriers 42—42. If desired, the barriers or partition walls 43—43 may be disposed approximately tangentially to the inner cone wall 11 of the tuyère. Said barriers or partition walls 43—43 are disposed symmetrically with relation to one another. As illustrated in Figures 18, 19 and 20, the partition walls 43—43 extend toward the nose of the tuyère approximately to the plane which comprises the locus of the rear extremities of the radial barriers 42—42. It will be understood that the barriers or partition walls 43—43 may, if preferred, extend into the spaces defined by the planes of the radial barriers 42—42, so that said barriers or partition walls 43—43 will have overlapping relationship with the radial partition walls 42—42. The partition wall 14 is provided with the substantially radial barrier 44, which merges with an inner longitudinal edge of one of the barriers or partition walls 43. The water inlet tube 16 communicates with the nose portion of the tuyère on one side of said radial partition wall 44, and, as the parts are viewed in Figures 19 and 20, the cooling water follows a clockwise course through the nose portion of the tuyère between the barrier 14 and the nose wall of the tuyère. Cooling water is guided in its course circumferentially of the tuyère by the angularly disposed barriers or partition walls 43 forming part of the partition wall 14 and the radially disposed partition walls 42 which form part of the nose wall 12. The course of the water is circuitous, passing back and forth longitudinally of the nose portion of the tuyère and back and forth radially with respect to the tuyère in a course which may be aptly described as helical. Cooling water, after passing around the nose portion of the tuyère, passes out through the aperture 18 into the base portion of the tuyère.

The embodiment of the present invention illustrated in Figures 21, 22, 23 and 24 is a carrying forward of the invention disclosed in Figures 8 to 14 inclusive of the application of Fox and Whitcomb Serial No. 725,622, filed May 14, 1934. The jacket provided by the rear wall 13, nose wall 12, inner cone wall 11 and outer cone wall 10 is provided with the partition wall 14 as in the embodiments of the invention above described. The tube 16 serves to conduct cooling water from the exterior of the tuyère through the back wall 13 and through the partition wall 14 to the nose portion of the tuyère between said partition wall 14 and the nose wall 12. Said nose portion of the tuyère is provided with a plurality of barriers to cause the cooling medium flowing from the inlet tube 16 to the outlet aperture 18 to take a circuitous path, the flow of cooling medium in the nose of the tuyère being of high velocity. One of the barriers referred to is indicated by the numeral 45, which barrier is disposed circumferentially of the tuyère, dividing the space between the outer cone wall 10 and the inner cone wall 11 into two annular spaces disposed coaxially with respect to the tuyère. Said barrier 45 may be cast integral with the cone walls 10 and 11 and the nose wall 12, being united to said cone walls 10 and 11 by barriers, to be referred to presently. However, said barrier 45 stops short of the adjacent surface of the nose wall 12. Said circumferential barrier 45 extends outwardly to the partition wall 14. A radial barrier 46 is provided extending radially from the inner cone wall 11 to the outer cone wall 10 and extending longitudinally from the nose wall 12 to the partition wall 14.

Disposed in symmetrically spaced relationship with the radial barrier 46 and with one another are a plurality of radial barriers 47 extending from the inner cone wall 11 to the circumferential barrier 45. Said barriers 47—47 extend from the partition wall 14 to the nose wall 12, merging into said nose wall 12 and being integral therewith. Radially disposed relative to the tuyère are a plurality of barriers 48—48 extending between the circumferential barrier 45 and the outer cone wall 10 of the tuyère. Said barriers 48—48 extend from the partition wall 14 to the nose wall 12, merging into said nose wall and being integral therewith. Said barriers 48—48 are disposed symmetrically with respect to the barriers 47—47, the radial planes marking the barriers 48—48 being spaced substantially midway between the radial planes marking the barriers 47—47. Disposed in radial planes coincident with the barriers 47—47 are short barriers extending from the nose wall 12 to the plane indicated by the numeral 49 (Fig. 21). Said short barriers are indicated by the numerals 47a—47a and extend between the inner cone wall 11 and the annular barrier 45. Disposed in radial planes coincident with the barriers 48—48 are short barriers extending from the nose wall 12 to the plane indicated by the numeral 49. These last mentioned short barriers are indicated by the numerals 48a—48a and extend between the annular barrier 45 and the outer cone wall 10.

The barriers 46 form a plurality of passages in the nose portion of the tuyère adjacent to the partition wall 14, which passages are disposed just inside of the outer cone wall 10 of the tuyère. Said passages, reading in a counter-clockwise direction in Figure 22, bear the numerals 50, 51, 52, 53, 54, 55 and 56. Said passage 56 communicates with the aperture 18 communicating with the base portion of the jacket of the tuyère. Disposed symmetrically with the passages 50 to 56 inclusive is a series of passages defined by the barriers 47—47, which passages are located adjacent to the inner cone wall 11 of the tuyère. Said passages, reading in a counter-clockwise direction in Figure 22, bear the numerals 57, 58, 59, 60, 61 and 62. The barriers 47a and 48a provide a plurality of channels communicating with the passages 50 to 56 inclusive and the passages 57 to 62 inclusive. Said channels, reading in a clockwise direction in Figures 23 and 24, bear the numerals 63, 64, 65, 66, 67, 68, 69, 70, 71, 72, 73 and 74, disposed circumferentially in proximity to the outer cone wall 10 of the nose portion of the tuyère, and the channels 75, 76, 77, 78, 79, 80, 81, 82, 83, 84, 85 and 86 disposed circumferentially in proximity to the inner cone wall 11 of the tuyère. Remembering that the annular barrier 45 stops short of the nose wall 12 of the tuyère, it will be noted that a continuous circuitous path is provided for the cooling medium in the nose portion of the tuyère from the inlet tube 16 to the aperture 18 leading to the base portion of the jacket of the tuyère, which path conducts the cooling medium back and forth longitudinally of the tuyère along the short barriers 47a and 48a through the channels just referred to. Tracing the course of the cooling medium, entry is made through the water inlet tube 16 to the passage 50, into the channel 63, said cooling medium passing around the forward extremity of the annular barrier 45 into the channel 75 in the direction of the arrow between said channels in Figure 24. Said cooling medium passes rearwardly around the rear extremity of the short barrier 48a, thence forwardly in channel 76 past the forward extremity of the annular barrier 45 into the channel 64, thence rearwardly around the rear extremity of the short barrier 47a, and then forwardly in channel 65, rearwardly in channel 77, forwardly in channel 78, rearwardly in channel 66, forwardly in channel 67, rearwardly in channel 79, forwardly in channel 80, rearwardly in channel 68, forwardly in channel 69, rearwardly in channel 81, forwardly in channel 82, rearwardly in channel 70, forwardly in channel 71, rearwardly in channel 83, forwardly in channel 84, rearwardly in channel 72, forwardly in channel 73, rearwardly in channel 85, forwardly in channel 86, rearwardly in channel 74. Said channel 74 communicates with the passage 56 and outlet aperture 18 communicating with the base portion of the jacket of the tuyère. Though only one inlet opening and one discharge opening in the nose portion of the tuyère are illustrated, it will be clear that a plurality of inlets and a corresponding number of outlets may be provided if preferred, a sufficient number of radial partition walls 49 being provided to insure the predetermined course of water from a certain inlet opening to a certain discharge opening; or, the inlet and outlet may be located in diametrically opposite parts of the partition wall 14 and the water might pass in two parallel paths around the two halves to the tuyère, though such construction is not preferred.

In the modifications illustrated and described in Figures 1 to 24, the inner cone wall 11 has a conical surface both on the blast side thereof and on the water-contacting side thereof, and the partition wall 14 is split so that it may be sprung to enable it to be assembled in position between the inner cone wall 11 and the outer cone wall 10. In the event that it is preferred to make the partition wall 14 so heavy that it cannot be readily sprung, the construction illustrated in Figure 25 may be used. According to this construction, the water-contacting surface of the inner cone wall 11 is substantially cylindrical from the base portion thereof to the region of the partition wall 14, so that the base wall 13 and the partition wall 14 may be assembled in position without any springing of said partition wall 14.

Though certain embodiments of the present invention have been described in detail, many modifications will be apparent to those skilled in the art. It is intended to illustrate those modifications which fall within the scope of the appended claims.

What is claimed is—

1. A blast furnace tuyère comprising a body defining an air blast passage, said body having within its walls a water circulation space, a closure for the outer end of said space borne by said body, a transverse partition wall in said space adjacent to but spaced from the nose end of said tuyère, an inlet conduit for delivering water through said closure and said partition wall into the space disposed inwardly of said partition wall, said partition wall being provided with an aperture in spaced relationship with said conduit, said closure being provided with an outlet communicating with said water circulation space and an annular partition formed integral with said body and extending from the nose of said tuyère into the adjacent portion of said water circulation space approximately coaxial with said tuyère.

2. A blast furnace tuyère comprising a body defining an air blast passage and having within its walls a water circulation space, a closure for the outer end of said space borne by said body, said closure being provided with conduit means and a port, a transverse partition wall disposed within said water circulation space adjacent to but spaced from the nose end of said tuyère, said conduit means providing communication through said partition wall, said partition wall having an aperture providing communication between the regions on the two sides thereof, and heat conducting means integral with said body and extending from the nose of said tuyère into the adjacent portion of said water circulation space for materially increasing the transfer of heat from the nose of said tuyère to the water circulating within said space.

3. A blast furnace tuyère comprising a body defining an air blast passage and having a nose portion, said body having within its walls a water circulation space, a closure for the outer end of said space borne by said body, said closure being provided with means providing a water conduit and a port, a transverse partition wall within said space adjacent to but spaced from the nose end of said tuyère, said water conduit providing communication with the space between said partition wall and the nose end of said tuyère, said partition wall having an aperture for allowing the passage of water from one side of said partition wall to the other side thereof and an element of approximately ring shape formed integral with said body and extending from said nose end into the adjacent portion of said space.

4. In a tuyère, in combination, walls providing an annular jacket for cooling medium, one of said walls having therein an inlet port and an outlet port, a transverse partition wall in said jacket adjacent to but spaced from the nose of said tuyère, a conduit extending from one of said ports and extending through said partition wall and opening into the space between said partition wall and the nose of said tuyère, said partition wall having an aperture providing communication between the regions on the two sides of said partition wall, a radial barrier extending from said partition wall to the nose of said tuyère, said conduit and said aperture being located adjacent to but on opposite sides of said radial barrier, and a radial barrier extending from said partition wall to the base of said tuyère, said last mentioned radial barrier being disposed in position to prevent the short-circuiting of said cooling medium from said aperture to said outlet.

5. In a tuyère, in combination, walls, including a back wall, an inner cone wall, an outer cone wall and a nose wall, providing an annular jacket for cooling medium, said back wall having a water inlet and a water outlet, a partition wall in said jacket adjacent to but spaced from the nose of said tuyère, a tube extending from said water inlet and extending through said partition wall and opening into the space between said partition wall and the nose of said tuyère, said tube comprising supporting means for carrying said partition wall, and other supporting means for supporting said partition wall from said back wall, said partition wall having an aperture providing communication between the regions on the two sides of said partition wall.

6. In a tuyère, in combination, walls including a back wall, an inner cone wall, an outer cone wall and a nose wall providing an annular jacket for cooling medium, said back wall having a water inlet port and a water outlet port, a partition wall in said jacket adjacent to but spaced from the nose of said tuyère, a tube extending from one of said ports and extending through said partition wall and opening into the space between said partition wall and the nose of said tuyère, said tube comprising supporting means for carrying said partition wall and other supporting means for supporting said partition wall from said back wall, said partition wall having an aperture providing communication between the regions on the two sides of said partition wall, and a barrier connecting regions of said inner cone wall and said outer cone wall and extending from said partition wall to the nose of said tuyère, said tube and said aperture being located adjacent to but on opposite sides of said barrier.

7. In a tuyère, in combination, walls including a back wall, an inner cone wall, an outer cone wall and a nose wall providing an annular jacket for cooling medium, said back wall having a water inlet port and a water outlet port, a partition wall in said jacket adjacent to but spaced from the nose of said tuyère, a tube extending from one of said ports and extending through said partition wall and opening into the space between said partition wall and the nose of said tuyère, said tube comprising supporting means for carrying said partition wall and other supporting means for supporting said partition wall from said back wall, said partition wall having an aperture providing communication between the regions on the two sides of said partition wall, and a barrier connecting regions of said inner cone wall and said outer cone wall and extending from the nose of said tuyère to the base thereof, said tube and said aperture being located adjacent to but on opposite sides of said radial barrier.

8. In a tuyère, in combination, cone walls, a nose wall and a back wall providing an annular jacket for cooling medium, a partition wall in said jacket adjacent to but spaced from said nose wall, and a conduit for conducting cooling water to the space in said jacket between said partition wall and said nose wall, said partition wall having an aperture providing communication between the region on one side thereof and the region on the other side thereof, said partition wall being carried by said back wall, said back wall being provided with an outlet opening for cooling water.

9. In a tuyère, in combination, a nose wall, inner and outer cone walls and a back wall, said walls providing an annular jacket for cooling medium, one of said walls having therein a water inlet port and a water outlet port, a partition wall in said jacket adjacent to but spaced from the nose wall of said tuyère, said partition wall being disposed transversely of said tuyère, and means providing a conduit extending from one of said ports through said partition wall and communicating with the space between said partition wall and the nose of said tuyère, said partition wall having an aperture providing communication between the regions on the two sides of said partition wall, said walls at the nose portion of said tuyère being formed to provide an undulating passageway extending circumferentially of said tuyère.

10. In a tuyère, in combination, a nose wall, inner and outer cone walls, a partition wall and a back wall, said partition wall being disposed transversely of said tuyère, said walls providing an annular jacket for cooling medium, said back wall having therein a water inlet and a water outlet, and means for directing water from said water inlet directly to the nose portion of said tuyère, said jacket at the nose portion of said tuyère being formed to provide an undulating passageway circumferentially of said tuyère.

11. In a tuyère, in combination, a nose wall, inner and outer cone walls, a partition wall and a back wall, said partition wall being disposed transversely of said tuyère, said walls providing an annular jacket for cooling medium, said back wall having a water inlet and a water outlet, and means for conducting water from said inlet directly to the nose portion of said tuyère and circumferentially of said tuyère and thence to the base portion of said tuyère, said jacket at the nose portion of said tuyère having cooperating undulating surfaces to provide a smooth undulating passageway for cooling medium circumferentially of said tuyère.

12. In a tuyère, in combination, a nose wall, inner and outer cone walls and a back wall, said walls providing an annular jacket for cooling medium, said back wall having a water inlet and a water outlet, and means for conducting water from said inlet directly to the nose portion of said tuyère and circumferentially of said tuyère in a definitely walled path and thence to the base portion of said tuyère, said tuyère having means for providing a smooth undulating passageway for said cooling medium as it flows circumferentially of said tuyère.

13. In a tuyère, in combination, a nose wall, inner and outer cone walls and a back wall, said walls providing an annular jacket for cooling medium, said back wall having a water inlet and a water outlet, a partition wall extending into said jacket from said nose wall, said partition wall being circumferentially disposed throughout the greater portion of said tuyère, said partition wall having one of its ends joined with said inner cone wall and the other of its ends joined to the outer cone wall whereby to provide a channel extending substantially twice around the nose portion of said tuyère, one end of said channel communicating with said water inlet, the other end of said channel communicating with said water outlet.

14. In a tuyère, in combination, a nose wall, inner and outer cone walls and a back wall, said walls providing an annular jacket for cooling medium, said back wall having a water inlet and a water outlet, a partition wall extending into said jacket from said nose wall, said partition wall being circumferentially disposed throughout the greater portion of the nose portion of said tuyère, said partition wall having one of its ends joined with said inner cone wall and the other of its ends joined to the outer cone wall whereby to provide a channel extending substantially twice around the nose portion of said tuyère, and means for conducting water to one end of said channel and for conducting water from the other end of said channel into the base portion of said tuyère.

15. In a tuyère, in combination, a nose wall, inner and outer cone walls and a back wall, said walls providing an annular jacket for cooling medium, said back wall having a water inlet and a water outlet, means for conducting water from said inlet directly to the nose portion of said tuyère and circumferentially of said tuyère and thence to the base portion of said tuyère, and a partition wall in the nose portion of said tuyère extending from said nose wall, said partition wall being through most of its length disposed circumferentially of said tuyère but having one of its ends joined to the inner cone wall and the other of its ends joined to the outer cone wall.

16. In a tuyère, in combination, a nose wall, inner and outer cone walls and a back wall, said walls providing an annular jacket for cooling medium, said back wall having a water inlet and a water outlet, a partition wall in the nose portion of said tuyère extending into said jacket from the nose wall of said tuyère, said partition wall having one of its ends joined to the inner cone wall and the other of its ends joined to said outer cone wall, said points of juncture of said inner and outer cone walls being substantially in the same radial plane whereby to provide a channel for water extending substantially twice around the nose portion of said tuyère, means for conducting water from said inlet directly to one end of said channel, and means for causing said water to flow circumferentially of said tuyère in said channel, said means providing communication between said nose portion and the base portion of said tuyère.

17. In a tuyère, in combination, a nose wall, inner and outer cone walls and a back wall, said walls providing an annular jacket for cooling medium, one of said walls having therein a water inlet port and a water outlet port, a partition wall in said jacket adjacent to but spaced from the nose wall of said tuyère, said partition wall being disposed transversely of said tuyère, and means providing a conduit extending from said water inlet through said partition wall and opening into the space between said partition wall and the nose of said tuyère, said partition wall having an aperture providing communication between the regions on the two sides of said partition wall, certain of said walls at the nose portion of said tuyère being formed to provide an undulating passageway extending circumferentially of said tuyère.

18. In a tuyère, in combination, a nose wall, inner and outer cone walls and a back wall, said walls providing an annular jacket for cooling medium, one of said walls having therein a water inlet port and a water outlet port, a partition wall in said jacket adjacent to but spaced from the nose wall of said tuyère, said partition wall being disposed transversely of said tuyère, and means providing a conduit extending from one of said ports through said partition wall and communicating with the space between said partition wall and the nose of said tuyère, said partition wall having an aperture providing communication between the regions on the two sides of said partition wall, said nose wall and said partition wall having cooperating surfaces providing an undulating passageway extending circumferentially of said tuyère.

19. In a tuyère, in combination, a nose wall, inner and outer cone walls and a back wall, said walls providing an annular jacket for cooling medium, one of said walls having therein a water inlet port and a water outlet port, a partition wall in said jacket adjacent to but spaced from the nose wall of said tuyère, said partition wall being disposed transversely of said tuyère, and means providing a conduit extending from one of said ports through said partition wall and communicating with the space between said partition wall and the nose of said tuyère, said partition wall having an aperture providing communication between the regions on the two sides of said partition wall, certain of said walls having cooperating surfaces providing an undulating passageway extending circumferentially of the tuyère.

20. In a tuyère, in combination, a nose wall, inner and outer cone walls and a back wall, said walls providing an annular jacket for cooling medium, said back wall having a water inlet port and a water outlet port, a partition wall in the nose portion of said jacket, said partition wall being circumferentially disposed throughout the greater portion of the circumference of the nose portion of said tuyère, said circumferentially disposed partition wall being connected to said inner and outer cone walls to provide a channel having approximately a double turn for cooling water around the nose portion of said tuyère, and means for directing cooling water from one of said ports to one end of said channel and directing said cooling water circumferentially of the tuyère in the nose portion thereof and thereafter delivering said cooling water to the base portion of said tuyère.

21. In a tuyère, in combination, a nose wall, inner and outer cone walls and a back wall, said walls providing an annular jacket for cooling medium, said back wall having a water inlet port and a water outlet port, a partition wall in the nose portion of said jacket, said partition wall being circumferentially disposed throughout the greater portion of the circumference of the nose portion of said tuyère, said circumferentially disposed partition wall being connected to said inner and outer cone walls to provide a channel having approximately a double turn for cooling water around the nose portion of said tuyère, a transverse partition wall in said jacket adjacent to said circumferentially disposed partition wall, and a conduit leading to one end of said channel, said transverse partition wall having an aperture connecting with the other end of said channel and with the base portion of said jacket.

22. In a tuyère, in combination, a nose wall, inner and outer cone walls and a back wall, said walls providing an annular jacket for cooling medium, said back wall having a water inlet port and a water outlet port, a partition wall in the nose portion of said jacket, said partition wall being circumferentially disposed throughout the greater portion of the circumference of the nose portion of said tuyère, said circumferentially disposed partition wall being connected to said inner and outer cone walls to provide a channel having approximately a double turn for cooling water around the nose portion of said tuyère, one end of said channel having communication with one of said ports, the other end of said channel having communication with the other of said ports.

23. In a tuyère, in combination, a nose wall, inner and outer cone walls and a back wall, said walls providing an annular jacket for cooling medium, said back wall having a water inlet port and a water outlet port, a partition wall adjacent to but spaced from the nose wall of said tuyère, said partition wall being disposed transversely of said tuyère, a circumferential partition wall in the nose portion of said tuyère, said partition wall at one of its extremities being united to said inner and outer cone walls and at its other extremity providing an aperture communicating with the two sides of said circumferentially disposed partition wall whereby to provide a channel having approximately a double turn for cooling water around the nose portion of said tuyère, and means providing a conduit communicating with one of said ports and with one extremity of said channel, said transversely disposed partition wall having an aperture providing communication from the other end of said channel to the base portion of said tuyère.

24. In a tuyère, in combination, a nose wall, inner and outer cone walls and a back wall, said walls providing an annular jacket for cooling medium, said back wall having a water inlet port and a water outlet port, a partition wall adjacent to but spaced from the nose wall of said tuyère, said partition wall being disposed transversely of said tuyère, a circumferential partition wall in the nose portion of said tuyère, one extremity of said circumferentially disposed partition wall being united to said inner cone wall, the other extremity of said circumferentially disposed partition wall being united to said outer cone wall whereby to provide an elongated circumferential channel, and means providing a conduit connecting one of said ports with one end of said channel, said transversely disposed partition wall having an aperture providing communication between the other end of said channel and the base portion of said tuyère.

25. In a tuyère, in combination, a nose wall, inner and outer cone walls and a back wall, said walls providing an annular jacket for cooling medium, said back wall having a water inlet port and a water outlet port, a partition wall adjacent to said nose wall but spaced therefrom, said partition wall being disposed transversely of said tuyère, said nose wall and said partition wall having means projecting therefrom for causing cooling water in the nose portion of said jacket to flow back and forth longitudinally of said tuyère while flowing circumferentially of said tuyère, and means providing a conduit providing communication from one of said ports through said partition wall to the nose portion of said tuyère, said partition wall having a water outlet providing communication between the nose portion of said tuyère and the base portion of said tuyère.

26. In a tuyère, in combination, walls providing an annular jacket for cooling medium, one of said walls having therein a water inlet port and a water outlet port, a partition wall in said jacket disposed transversely of said tuyère, radial barriers in said jacket adjoining the nose of said tuyère and other radial barriers carried by said partition wall and located in the nose of said tuyère, said first-mentioned barriers being spaced circumferentially with respect to said second-mentioned barriers whereby to cause cooling medium to flow back and forth along said barriers while traveling circumferentially with respect to said tuyère, spaced regions of the nose portion of said jacket being connected to said ports.

27. In a tuyère, in combination, walls providing an annular jacket for cooling medium, one of said walls having therein a water inlet port and a water outlet port, a plurality of radially disposed barriers in said jacket extending rearwardly from the nose of said tuyère, a transversely disposed partition wall in said jacket adjacent to but spaced from the nose of said tuyère, and a plurality of other radially disposed barriers extending from said partition wall to the region of said first mentioned barriers, said other barriers being spaced circumferentially with respect to said first mentioned barriers, spaced regions of the nose portion of said jacket being connected to said ports.

28. In a tuyère, in combination, walls providing an annular jacket for cooling medium, one of said walls having an inlet opening and an outlet opening communicating with said jacket, a transversely disposed partition wall dividing said jacket into a nose portion and a base portion, inlet means for delivering cooling water from the outside of said tuyère through said partition wall to said nose portion, said partition wall having an outlet aperture for permitting the exit of cooling water from said nose portion to said base portion, a partition wall extending longitudinally of said nose portion to prevent short-circuiting of cooling medium from said inlet means to said outlet aperture, a plurality of radially disposed barriers in said jacket extending rearwardly from the nose of said tuyère, and a plurality of other radially disposed barriers extending from said first mentioned partition wall toward the nose of said tuyère, said other barriers being spaced circumferentially with respect to said first mentioned barriers.

29. In a tuyère, in combination, a nose wall, inner and outer cone walls and a back wall, said walls providing an annular jacket for cooling medium, one of said walls having therein a water inlet and a water outlet, a partition wall in said jacket adjacent to but spaced from the nose wall of said tuyère, said partition wall being disposed transversely of said tuyère, means providing a conduit extending from said water inlet through said partition wall and opening into the space between said partition wall and the nose of said tuyère, said partition wall having an aperture providing communication between the regions on the two sides of said partition wall, barriers in the nose portion of said jacket extending between said inner cone wall and said outer cone wall and spaced circumferentially of the nose portion of said tuyère, and barriers in the nose portion of said jacket carried by said partition wall extending between said inner cone wall and said outer cone wall, said last mentioned barriers being disposed in planes bisecting the pockets formed by their neighboring first mentioned barriers and said inner and outer cone walls whereby to provide a substantially helical passageway extending circumferentially of said tuyère.

30. In a tuyère, in combination, a nose wall, inner and outer cone walls and a back wall, said walls providing an annular jacket for cooling medium, one of said walls having therein a water inlet and a water outlet, a partition wall in said jacket adjacent to but spaced from the nose wall of said tuyère, said partition wall being disposed transversely of said tuyère, and means providing a conduit extending from said water inlet through said partition wall and opening into the space between said partition wall and the nose of said tuyère, said partition wall having an aperture providing communication between the regions on the two sides of said partition wall, the nose portion of said tuyère having a plurality of barriers connecting said inner cone wall and said outer cone wall, said barriers being spaced circumferentially of said tuyère to form pockets bounded by said radial barriers and said inner and outer cone walls, said partition wall having a plurality of other barriers projecting into the nose portion of said tuyère, said last mentioned barriers lying in planes bisecting said pockets.

31. In a tuyère, in combination, walls providing an annular jacket for cooling medium, one of said walls providing a plurality of openings communicating with said jacket, a partition wall in said jacket adjacent to but spaced from the nose of said tuyère, means providing a conduit for conducting water from one of said openings through said partition wall to the nose portion of said jacket, said partition wall having an aperture providing communication between the nose portion of said jacket and the base portion thereof, a longitudinal partition wall dividing the nose portion of said jacket to prevent the short-circuiting of said cooling medium between said conduit and said aperture in the nose portion of said jacket, and barriers disposed within said jacket for causing cooling medium to flow back and forth longitudinally of the nose of said jacket in passing between said conduit and said aperture.

32. In a tuyère, in combination, walls providing an annular jacket for cooling medium, a transverse partition wall in said jacket adjacent to but spaced from the nose of said tuyère, an annular barrier disposed within said nose portion of said jacket and extending from said partition wall to a region adjacent to but spaced from the nose end of said tuyère, and radially disposed barriers in said nose portion joining with said annular barrier and arranged for causing cooling medium in the nose portion of said jacket to flow back and forth longitudinally of said tuyère while traveling circumferentially thereof.

33. In a tuyère, in combination, walls providing an annular jacket for cooling medium, one of said walls having a pair of openings communicating with said jacket, a partition wall in said jacket adjacent to but spaced from the nose of said tuyère, means providing a jacket for conducting water from one of said openings through said partition wall to the nose portion of said jacket, an aperture providing communication between the nose portion of said jacket and the base portion thereof, a longitudinal partition wall dividing the nose portion of said tuyère longitudinally to prevent short-circuiting of cooling medium between said conduit and said aperture, an annular barrier within the nose portion of said jacket dividing the nose portion of said jacket into an inner compartment and an outer compartment, radial barriers in said inner compartment dividing said compartment adjacent to said transverse partition wall into a plurality of circumferentially spaced passages, radial barriers in said outer compartment dividing said compartment adjacent to said first mentioned partition wall into a plurality of circumferentially spaced passages, the passages in said inner compartment being staggered with respect to the passages in said outer compartments, and other radial barriers in said inner and outer compartments providing channels serially connecting said passages to provide a circuit of flow from said tube through said nose portion to said aperture back and forth longitudinally of the nose portion of said tuyère.

34. In a tuyère, in combination, walls providing an annular jacket for cooling medium, a partition wall in said jacket adjacent to but spaced from the nose of said tuyère, an annular barrier in the nose portion of said tuyère extending from said partition wall to a region adjacent to but spaced from the nose end of said tuyère, and radially disposed barriers joining with said annular barrier and arranged for causing cooling medium in the nose portion of said jacket to flow in a tortuous course progressively, longitudinally, radially and circumferentially of the nose portion of said tuyère.

35. In a tuyère, in combination, a nose wall, inner and outer cone walls and a back wall, said walls providing an annular jacket for cooling medium, said back wall having therein a water inlet and a water outlet, the cooling medium contacting surfaces of said outer cone wall and said inner cone wall being formed to provide a passageway undulating to and from the axis of said tuyère from said water inlet to said water outlet.

36. In a tuyère, in combination, a nose wall, inner and outer cone walls and a back wall, said walls providing an annular jacket for cooling medium, said back wall having a water inlet and a water outlet, and a partition wall extending into said jacket from said nose wall, said partition wall being circumferentially disposed throughout the greater portion of said tuyère, said partition wall having one of its ends joined with said inner cone wall and with said outer cone wall whereby to provide a channel extending substantially twice around the nose portion of said tuyère, one end of said channel communicating with said water inlet, the other end of said channel communicating with said water outlet.

37. In a tuyère, in combination, a nose wall, inner and outer cone walls and a back wall, said walls providing an annular jacket for cooling medium, said back wall having a water inlet port and a water outlet port, and a partition wall in said tuyère, said partition wall being circumferentially disposed throughout the greater portion of said tuyère, said circumferentially disposed partition wall being connected to said inner and outer cone walls to provide a channel having approximately a double turn for cooling medium around said tuyère, one end of said channel communicating with said water inlet port, the other end of said channel communicating with said water outlet port.

38. In a tuyère, in combination, walls forming a cooling jacket, a partition wall within said jacket disposed transversely of said tuyère providing a circumferential channel in said jacket at the nose region of said tuyère, and means for directing cooling water in a smooth undulating path through said channel.

39. A blast furnace tuyère consisting of a casting having a cylindrical body with an open control passage and a double encircling wall annularly closed at the front or nose end and similarly closed at the back end except for inlet and outlet ports to provide access to the space between the two walls for a stream of cooling fluid, the inner surface of the outer wall having corrugations to provide a greater heat-exchange surface for engagement by the cooling fluid.

40. A tuyère consisting of a cylindrical body open at both ends to define an air blast passage, an outer wall surrounding the cylindrical body and spaced therefrom to provide a chamber for receiving a cooling fluid, a front nose wall joining the front ends of the body and of the outer wall to close the cooling chamber, a rear wall joining the body and the outer wall and closing the chamber except for inlet and outlet ports in said rear wall, and closely adjacent corrugations extending back from the nose wall and on and along the inner surface of the outer wall into the cooling chamber to provide increased heat-transfer cooling surface for the front end of the tuyère.

41. A blast furnace tuyère consisting of a cylindrical body having a hollow or double wall closed at its forward end to constitute a nose, and closed at its outer end except for fluid inlet and outlet ports to provide access to the cooling chamber between the double walls, and a series of circumferentially spaced corrugations extending backward from the nose and along the outer wall into the cooling chamber, but spaced from the inner one of the double walls to provide an open passage free of pockets for the cooling fluid.

42. A blast furnace tuyère consisting of a casting having a cylindrical body with a hollow or double wall closed at its forward end to constitute a nose, and closed at its outer end except for fluid inlet and outlet ports to provide access to the cooling chamber between the double walls, and a series of spaced corrugations on the inner surface of the nose end of the outer wall.

GORDON FOX.